United States Patent
Murakami et al.

(10) Patent No.: US 6,435,018 B1
(45) Date of Patent: Aug. 20, 2002

(54) VEHICLE ABNORMALITY DIAGNOSIS SYSTEM

(75) Inventors: Taku Murakami, Yamato; Ichio Ichikawa, Sagamihara; Haruo Hashimoto, Kamakura; Fumihide Satou, Oyama, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/553,549

(22) Filed: Apr. 20, 2000

(30) Foreign Application Priority Data

Apr. 21, 1999 (JP) .......................................... 11-113663

(51) Int. Cl.[7] ....................... G01M 15/00; G01C 21/00; G08G 1/123; B60Q 1/00
(52) U.S. Cl. ...................... 73/117.2; 701/213; 340/992; 340/438
(58) Field of Search ............................... 73/116, 117.3, 73/117.2, 121, 128; 701/48, 213, 208, 29; 340/992, 439, 438

(56) References Cited

U.S. PATENT DOCUMENTS 6,089,080 A * 7/2000 Takaku et al. ............. 73/117.3
6,195,602 B1 * 2/2001 Hazama et al. .............. 701/48

* cited by examiner

*Primary Examiner*—Benjamin R. Fuller
*Assistant Examiner*—Maurice Stevens
(74) *Attorney, Agent, or Firm*—Varndell & Varndell, PLLC

(57) ABSTRACT

Either a specified point Q or a specified area Ar, at which an operating condition of a vehicle becomes a specified operating condition, is set beforehand from among points or areas on a travel route along which a vehicle travels. Then, an operating parameter P of a point in time ts1, ts2, ts3, ts4 . . . , tsn, at which a vehicle passes either a specified point Q or a specified area Ar, is obtained. Then, a vehicle abnormality is diagnosed on the basis of the values of these obtained operating parameters P (maximum values Pmax).

6 Claims, 10 Drawing Sheets

VEHICLE ABNORMALITY DIAGNOSIS SYSTEM

BACKGROUND OF THE INVENTION

1. Field of the Invention

The present invention relates to a vehicle abnormality diagnosis system for performing abnormality diagnoses, such as diagnosing malfunctions and predicting the service life of vehicles such as construction machines.

2. Description of the Related Art

In order to improve the reliability of a construction machine, carrying out abnormality diagnoses, such as diagnosing engine malfunctions, determining the extent of engine deterioration and predicting engine service life (predicting overhaul times), is essential. On the occasion when an abnormality diagnosis is performed, it is necessary to acquire, under the same operating conditions (condition that the machine is operated at a rated point on the torque curve), operating parameters the values of which change during construction machine operation, such as engine blow-by pressure, number of rotations, and fuel injection quantity. This is because it is not possible to compare data, and diagnose an abnormality unless operating parameters can be acquired under the same operating conditions.

Conventionally, operating parameters have been acquired in the following manner.

(a) First, the construction machine is shut down during work, and work is suspended.

(b) Then, as many measuring instruments, such as a pressure gauge and tachometer, as the number of operating parameters to be measured are mounted to an engine.

(c) In a state where a load is applied to the stopped construction machine and the torque converter is made to stall, engine speed and fuel injection quantity are carried to the rated point.

(d) If the value of an operating parameter achieves saturation and is stable, the data measured by the measuring instrument are read out and recorded.

However, shutting down the construction machine, and suspending work for the sake of taking measurements as mentioned in (a) above brings about reduced work efficiency.

Further, a person (serviceman) skilled in measurement work is needed to perform the work of mounting the measuring instruments for taking measurements, controlling the construction machine so that a fixed operating condition is achieved, and recording measurement data as mentioned in (b), (c), and (d) above,. Consequently, personnel costs will be increased for measurement purposes.

Further, as indicated in (c), (d) above, because measurements of operating parameters are taken in a state in which the construction machine has been shut down, and a torque converter has been made to stall, heat is generated by the torque converter. For this reason, a fixed operating state cannot be maintained for a long period of time (the limit is 20 seconds at the most). As a consequence, problems such as the following are incurred.

FIG. 6 shows conventional operating parameter measurement results. The horizontal axis is the time axis, and the vertical axis indicates the size of the respective operating parameters. FIG. 6 shows a case in which the respective parameters of engine speed, governor rack position (voltage value), pressure, exhaust temperature, oil temperature, and blow-by pressure are obtained. When engine speed and governor rack position (voltage value) rise, and a stable state (rated point) is achieved, the blow-by pressure also stabilizes, as indicated by S, and measurements can be taken at a time ts during the period S when blow-by pressure is stable. Furthermore, in the figure, blow-by pressure is pulsating, but measurements are taken after creating a stable waveform by performing signal processing, such as causing the signal to pass through a low pass filter. Governor rack position refers to a voltage value, which indicates the control rack position of an electrical governor of a fuel injection pump.

As shown in the same FIG. 6, out of consideration for heat generation by the torque converter, the stable period S after engine speed and governor rack position (voltage value) have risen all the way is very brief. Consequently, exhaust temperature does not reach saturation, and accurate data cannot be collected in the time ts.

As described above, when using the conventional method, wherein measurements are taken in a state in which the construction machine is shut down, depending on the type of operating parameter, saturation cannot be achieved, and accurate data cannot be collected.

In recent years, there have been attempts to acquire an operating parameter of a construction machine in time series fashion, and to carry out an abnormality diagnosis on the basis of the acquired time series data. Consequently, in addition to periodically making engine operating conditions fixed operating conditions, it is necessary to periodically acquire operating parameters. For this reason, as indicated in (a) above, the construction machine must be periodically shut down, and work must be suspended, causing the drop in work efficiency to become even more serious.

OBJECTS AND SUMMARY OF THE INVENTION

With the foregoing in view, a first object of the present invention is to enable the measurement of an operating parameter under a fixed operating condition without bringing about rising personnel costs, and without causing construction machine work efficiency to drop, and to enable the reliable acquisition of accurate data.

Further, conventionally, engine blow-by pressure has been detected, and an engine abnormality diagnosis has been made based on the size of the detected blow-by pressure. Blow-by pressure is a useful operating parameter for quantitatively detecting damage done to an engine.

Therefore, a second object of the present invention is to diagnose an engine abnormality more accurately by quantitatively detecting damage done to an engine using a new operating parameter related to blow-by pressure.

To achieve the first object of the present invention, a first invention is a vehicle abnormality diagnosis system for acquiring an operating parameter under a specified operating condition of a vehicle, a value of the operating parameter changing during an operation of the vehicle, and for diagnosing a vehicle abnormality on the basis of the value of the acquired operating parameter, wherein either a specified point or a specified area, at which the vehicle operating condition becomes the specified operating condition, is set beforehand from among points or areas on a travel route along which the vehicle travels, and an operating parameter of a point in time, at which the vehicle passed either the specified point or the specified area, is acquired, and an abnormality of a vehicle is diagnosed on the basis of a value of the acquired operating parameter.

According to the first invention, as shown in FIG. 5, either a specified point Q or a specified area Ar, at which an operating condition of a vehicle 50 becomes a specified operating condition, is set beforehand from among either each point or each area on a travel route 51, which a vehicle 50 travels.

As shown in FIG. 11, an operating parameter P of a point in time ts1, ts2, ts3, ts4 . . . , tsn, at which a vehicle 50 passes either a specified point Q or a specified area Ar, is obtained.

Then, as shown in FIG. 12, a vehicle abnormality is diagnosed on the basis of the values of these obtained operating parameters P (maximum values Pmax).

According to the first invention, since an operating parameter P is obtained under a specified operating condition while a vehicle 50 is travelling, there is no need to stop the vehicle for taking measurements. Consequently, work is not suspended, and a drop in work efficiency is not incurred. Further, since there is no need to perform the work of mounting measuring instruments, controlling a vehicle so that a fixed operating condition is achieved, or recording measured data, a person (serviceman), who is skilled at measurement work, is not required. Consequently, personnel costs do not rise.

Further, because an operating parameter can be obtained during vehicle 50 travel at a point, at which it becomes a specified operating condition, it is possible to collect accurate data in a state in which an operating parameter achieves saturation and is stabilized.

As described above, according to the first invention, the measuring of an operating parameter under a fixed operating condition can be performed without bringing about a rise in personnel costs, and without causing a drop in work efficiency, and accurate data can be reliably obtained.

Further, to achieve the first object of the present invention, a second invention is vehicle abnormality diagnosis system for acquiring an operating parameter under a specified operating condition of a vehicle, a value of the operating parameter changing during an operation of the vehicle, and for diagnosing a vehicle abnormality on the basis of the value of the acquired operating parameter, comprising setting means for setting beforehand from among points or areas on a travel route along which the vehicle travels, either a specified point or a specified area at which an operating condition of the vehicle becomes the specified operating condition; position detecting means for detecting the location of the vehicle when the vehicle is travelling on the travel route; trigger signal generating means for generating a trigger signal when a location detected by the position detecting means becomes a location corresponding to either the specified point or specified area; operating parameter acquiring means for acquiring an operating parameter in accordance with the trigger signal being generated; and abnormality diagnosing means for diagnosing a vehicle abnormality on the basis of a value of the acquired operating parameter.

According to the second invention, as shown in FIGS. 2 and 5, either a specified point Q or a specified area Ar, at which an operating condition of a vehicle 50 becomes a specified operating condition, is set beforehand from among points or areas on a travel route 51, which a vehicle 50 travels (Step 101).

Then, a location of vehicle 50 is detected when vehicle 50 is traveling on travel route 51.

Then, a trigger signal is generated when a detected location becomes a location corresponding to either a specified point Q or a specified area Ar (Steps 105, 106).

Then, an operating parameter is obtained in accordance with a trigger signal being generated (Step 107).

In this manner, as shown in FIG. 11, there is obtained an operating parameter P of a point in time ts1, ts2, ts3, ts4 . . . , tsn, at which vehicle 50 passes either a specified point Q or a specified area Ar.

Then, a vehicle abnormality is diagnosed on the basis of the values of these obtained operating parameters P (maximum values Pmax) (Steps 108, 109).

According to the second invention, the same effect as the first invention is achieved.

Further, a third invention is a vehicle abnormality diagnosis system according to either the first invention or the second invention, wherein the operating parameter is sequentially stored by corresponding the operating parameter to a time at which the operating parameter was acquired, and diagnosis of a vehicle abnormality is performed on the basis of time series data of the stored sequential operating parameters.

According to the third invention, as shown in FIG. 12, an operating parameter (maximum value Pmax) is sequentially recorded by making it correspondent to an acquired time (each τ time). Then, a vehicle abnormality is diagnosed on the basis of time series data DT of the recorded sequential operating parameters.

That is, according to the third invention, as shown in FIG. 11, there is acquired an operating parameter P of a point in time ts1, ts2, ts3, ts4, . . . , tsn, at which vehicle 50 passed either a specified point Q or a specified area Ar. Then, a maximum value Pmax of the operating parameter P is determined at τ time. Then, as shown in FIG. 12, a maximum value Pmax of each τ time of the operating parameter P is sequentially recorded by making same correspondent to a time (each τ time). Then, a vehicle abnormality is diagnosed by comparing time series data DT of the recorded sequential operating parameter maximum values Pmax against threshold values Pc1, Pc2, Pc3.

In this manner, according to the third invention, an operating parameter P is periodically acquired under a fixed operating condition while a vehicle 50 is traveling, and time series data DT is obtained. Consequently, it is possible to avoid periodically shutting down vehicle 50. In accordance therewith, it is possible to prevent significant drops in work efficiency due to periodic suspension of work.

Further, to achieve the first object and second object, a fourth invention is vehicle abnormality diagnosis system for acquiring data related to blow-by pressure under a specified operating condition of a vehicle, a value of the data changing during an operation of an engine of the vehicle, and for diagnosing a vehicle abnormality on the basis of the value of the acquired blow-by pressure-related data, wherein either a specified point or a specified area, at which blow-by pressure rises and the blow-by pressure overshoots, is set beforehand from among points or areas on a travel route along which the vehicle travels, and a blow-by pressure overshoot quantity of a point in time, at which the vehicle passes either the specified point or the specified area, is acquired, and a vehicle abnormality is diagnosed on the basis of a value of the acquired blow-by pressure overshoot quantity.

According to the fourth invention, as shown in FIG. 5, there is set beforehand, from among points or areas on a travel route 51, which vehicle 50 travels, either a specified point Q or a specified area Ar at which blow-by pressure rises, and blow-by pressure overshoots.

Then, as shown in FIG. 11, there is acquired a blow-by pressure overshoot quantity ΔP at a point in time ts1, ts2, ts3, ts4, . . . , tsn, at which vehicle 50 passed either a specified point Q or a specified area Ar. Then, a maximum value Pmax of the operating parameter P is determined at τ time. Then, as shown in FIG. 12, a vehicle abnormality is diagnosed on the basis of these acquired overshoot quantities (maximum value ΔPmax).

According to the fourth invention, the same effect as the first invention is obtained. Furthermore, according to the fourth invention, as shown in FIGS. 9(a), 9(b) and 9(c), the state of engine wear (amount of damage) is quantitatively detected from differences in the sizes of blow-by pressure overshoot quantities ΔP1, ΔP2, ΔP3. In accordance therewith, an engine abnormality can be more accurately diagnosed by comparison with a case in which a diagnosis was performed on the basis of blow-by pressure.

Further, to achieve the second object, a fifth invention is vehicle abnormality diagnosis system for acquiring data related to blow-by pressure, a value of the data changing during an operation of an engine of a vehicle, and for diagnosing a vehicle abnormality on the basis of the value of the acquired blow-by pressure-related data, comprising blow-by pressure overshoot quantity measuring means for measuring an overshoot quantity when blow-by pressure rises and the blow-by pressure overshoots; and abnormality diagnosing means for diagnosing a vehicle abnormality on the basis of a value of the measured blow-by pressure overshoot quantity.

According to the fifth invention, as shown in FIGS. 9(a), 9(b) and 9(c), the state of wear, or amount of damage of an engine is quantitatively detected from differences in the sizes of blow-by pressure overshoot quantities ΔP1, ΔP2, ΔP3. In accordance therewith, an engine abnormality can be more accurately diagnosed compared to a case in which a diagnosis was performed on the basis of blow-by pressure.

DESCRIPTION OF THE PREFERRED EMBODIMENTS

An embodiment of a vehicle abnormality diagnosis system according to the present invention will be explained hereinbelow by referring to the accompanying drawings.

Figure 1:
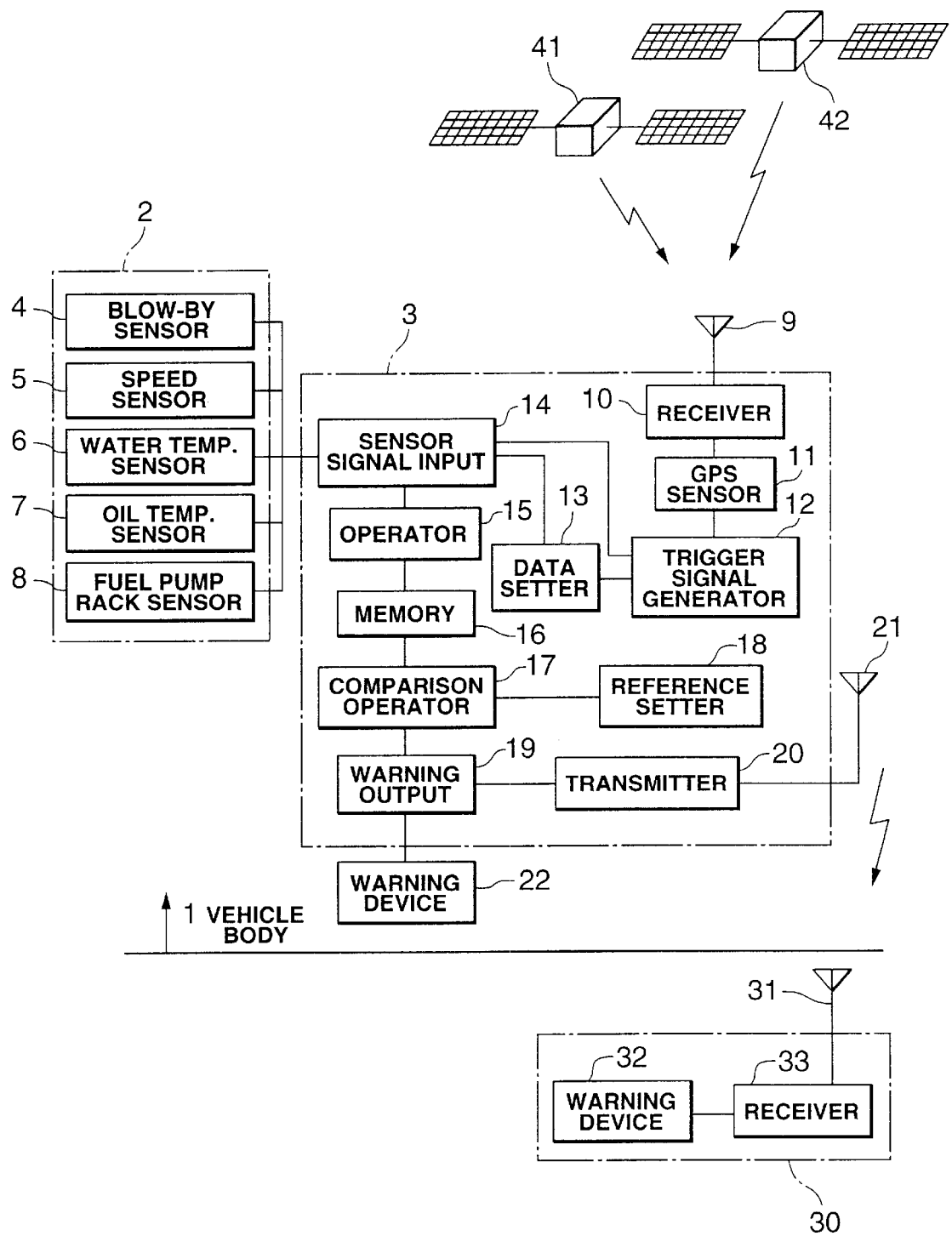
FIG. 1 is a block diagram of a vehicle abnormality diagnosis system according to an embodiment of the present invention.

FIG. 1 is a block diagram of an abnormality diagnosis system of an embodiment.

Figure 5:
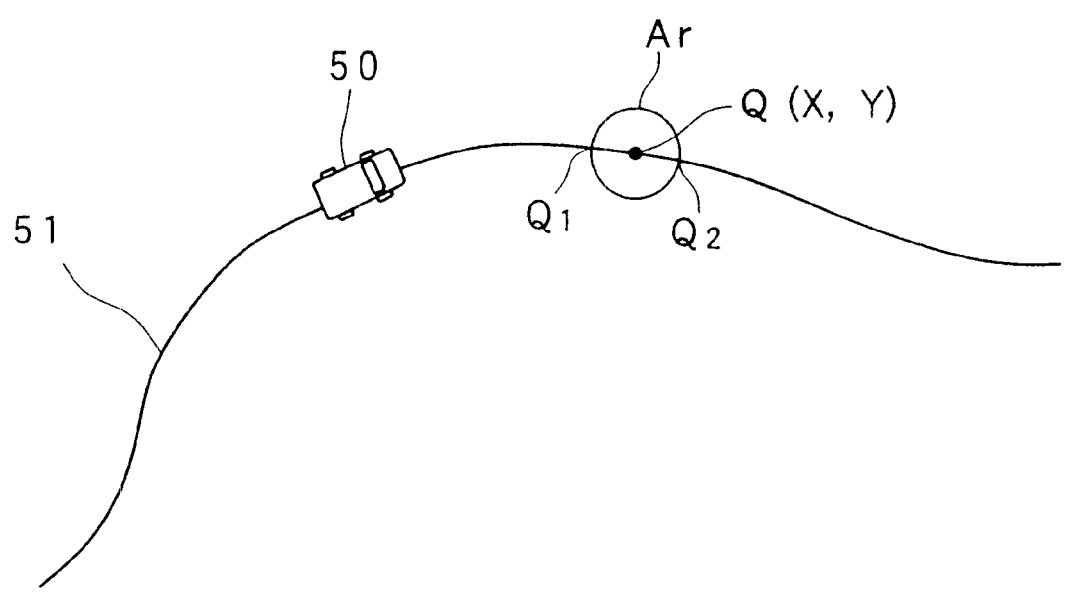
FIG. 5 is a diagram showing a state in which a vehicle in the embodiment is traveling on a travel route.
Figure 6:
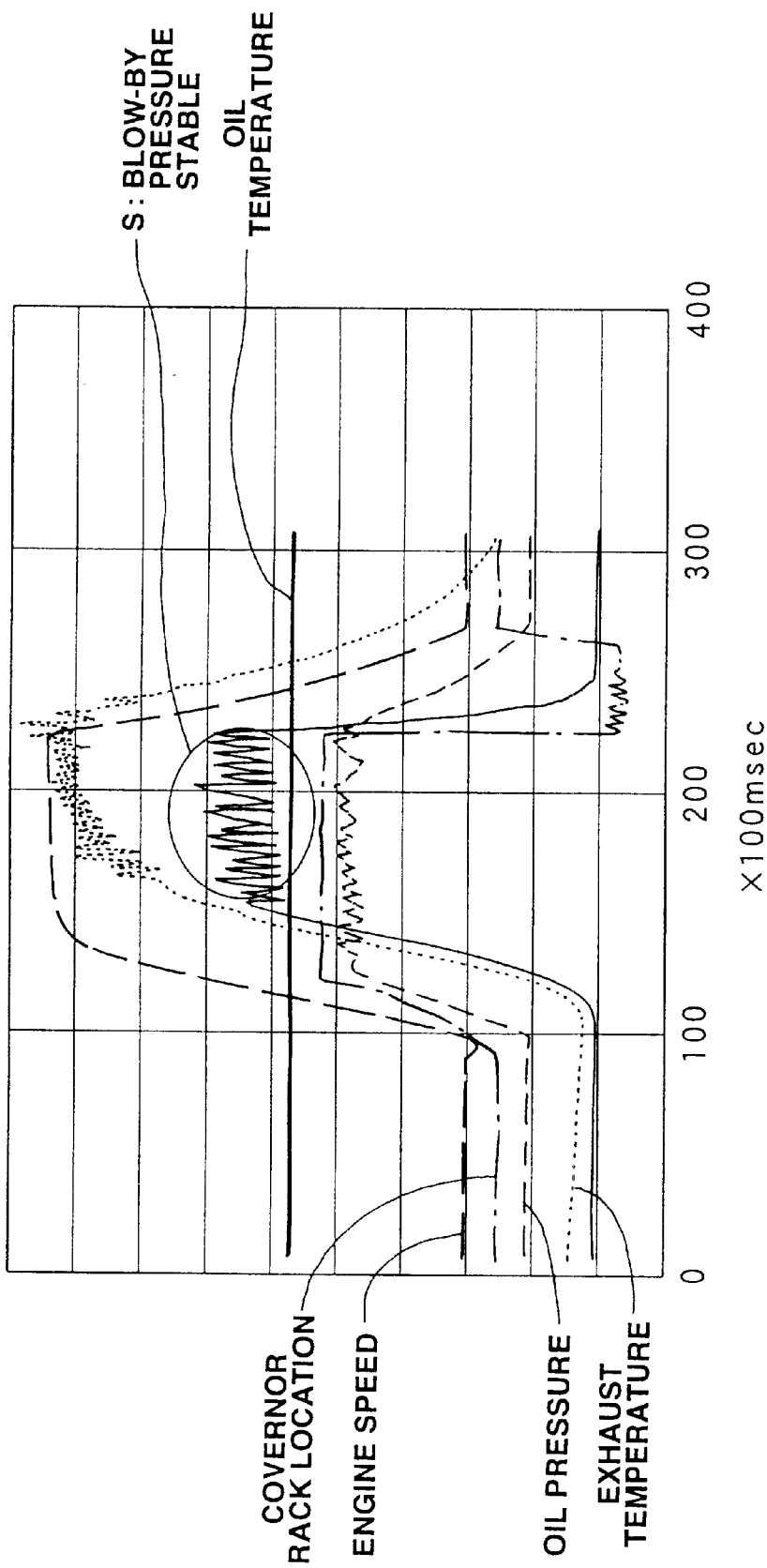
FIG. 6 is a diagram showing a waveform of each operating parameter when a conventional system is used.

In this embodiment, as shown in FIG. 5, there is supposed a dump truck or other construction machines 50 (hereinafter referred to as vehicle 50), which travels a travel route 51 in an extensive work site such as a mine.

As shown in FIG. 1, a system of the embodiment generally comprises GPS satellites 41, 42 for detecting the location of a vehicle 50, an engine 2 and controller 3 provided inside the body 1 of the vehicle 50, and a monitoring station 30 which is installed on an extensive work site. Furthermore, an office 30 separated from a work site may be used in place of the monitoring station 30.

In the engine 2, there are provided a blow-by pressure sensor 4 for detecting the blow-by pressure of the engine 2, a speed sensor 5 for detecting the speed of the engine 2, a water temperature sensor 6 for detecting the temperature of the cooling water of the engine 2, an oil temperature sensor 7 for detecting the temperature of the oil, which lubricates the engine 2, and a fuel pump rack sensor 8 for detecting as a voltage value the control rack position of an electrical governor of the engine 2 fuel injection pump. Furthermore, if a sensor (such as an exhaust temperature sensor) is required to diagnose the engine 2 abnormality, other sensors can similarly be provided.

The controller 3 receives, at a prescribed sampling interval, detection signals from the above-mentioned respective sensors 4–8, and performs processing that will be described hereinbelow. Each functional portion of the controller 3 shown in FIG. 1 either can be constituted by software, or can be constituted by hardware.

The location of the vehicle 50 is measured by a GPS (global positioning system).

Specifically, radio waves sent from GPS satellites 41, 42 are received by a GPS antenna 9, and are received and processed by a receiver device 10 of the controller 3. A GPS sensor 11 determines a pseudo-distance between GPS satellites 41, 42 and the receiving the vehicle 50 based on the time difference between. GPS satellite 41, 42 transmission time and reception time, computes a true distance by applying interpolation thereto, and detects the 2-dimensional location of the vehicle 50 on the Earth from this true distance. Furthermore, in this embodiment, the location of the vehicle 50 is detected by GPS, but means for detecting the location of the vehicle 50 are arbitrary. For example, a sensor for detecting the number of rotations of a wheel, and a sensor for detecting the bearing of a vehicle can be provided on the vehicle 50, and the location of the vehicle 50 can be computed from the output of these sensors. Further, a plurality of poles, the locations of which are known, can be installed at the site, where the vehicle 50 travels, and the current location of the vehicle 50 can be determined from the location of a pole, when the vehicle 50 passes the pole.

When it is determined by the hereinbelow-described processing of the controller 3 that the vehicle 50 has an abnormality, a warning signal is outputted to a warning device 22. The warning device 22 is a display element, buzzer, lamp, or the like. When a warning signal is applied to the warning device 22, either a buzzer sounds, a lamp lights up, or a display denoting a warning is displayed on the screen of a display element. In accordance therewith, it is possible to get the attention of the operator of the vehicle 50, or the surrounding vehicles, and people.

When a warning signal is generated by the controller 3, after transmission processing has been done by a transmitter device 20, a radio wave denoting the warning signal is transmitted wirelessly to the monitoring station 30 via an antenna 21. The radio wave sent from the vehicle 50 is received by the antenna 31 of the monitoring station 30, and is received and processed by a receiver device 33. Then, in accordance with the warning signal being inputted to a warning device 32, either a buzzer sounds, a lamp lights up, or a display denoting a warning is displayed on the screen of a display element the same as with warning device 22. In accordance therewith, it is possible to get the attention of the managers in the monitoring station 30. Furthermore, the constitution is such that a warning signal is sent to the monitoring station 30 from the controller 3 of the vehicle 50 by a radio communications channel, but a warning signal may also be sent to the monitoring station 30 by a wired communications channel.

In this embodiment, as shown in FIG. 5, there is set beforehand, from among points or areas on a travel route 51 on which the vehicle 50 travels, either a specified point Q or a specified area Ar at which the vehicle 50 operating condition becomes a specified operating condition.

Here, a specified operating condition is a rated operating state such that, for example, the engine 2 of the vehicle 50 is operating at a rated point on the torque curve. Furthermore, a specified operating condition does not necessarily have to be a rated operating state, but rather may be an operating state that is close to a rated operating state.

A specified area Ar is either an uphill road or a flat road. A specified point Q (X, Y) is a point on either an uphill road or a flat road. At an uphill road, the engine 2 achieves a rated operating state. Further, blow-by pressure rises, and overshoots. On either an uphill road or a flat road, the operating state of the engine 2 is stable, and becomes a fixed operating condition. The entrance to a specified area Ar is Q1, and the exit therefrom is Q2.

In this embodiment, it is supposed that a specified point Q has been set beforehand.

Next, the processing performed by a controller 3 will be explained while referring to the flowchart shown in FIG. 2.

First, in the controller 3, there is set a sampling interval at which a detection signal of each sensor 4–8 is read into the controller 3, and there is set the location (X, Y) of the above-mentioned specified point Q. Data setting is performed by a data setting portion 13 of the controller 3. Furthermore, data setting is performed by connecting a personal computer to the controller 3, uploading data, and writing over the internal data of the controller 3. Further, a setting switch can be provided on the controller 3, and internal data can be written over by operating the setting switch. Further, longitude and latitude can be used as location data of a specified point Q instead of a 2-dimensional coordinate location (Step 101).

When the engine 2 is started up in accordance with the operating of an engine key switch or the like (Step 102), a determination is made as to whether or not the engine 2 is running. This judgement is performed by determining whether or not the number of rotations detected by a speed sensor 5 has reached a prescribed threshold value (a number of rotations that is larger than 0 rotations, but smaller than the number of rotations for idling). Alternatively, a determination as to whether or not the engine 2 is running can also be made on the basis of a voltage value of an alternator or other generator (Step 103).

When the engine 2 is determined to be running, and it is determined that the engine 2 is in operation, a detection signal of each sensor 4–8 is read into the controller 3 at the above-mentioned set sampling interval. The processing by which a sensor signal is inputted to the controller 3 is performed by a sensor signal inputting portion 14 (Step 104).

Next, a determination is made as to whether or not the current location of the vehicle 50 detected by a GPS sensor 11 coincides with the location of a specified point Q (Step 105).

When the current location of the vehicle 50 detected by a GPS sensor 11 coincides with the location of a specified point Q, a trigger signal is generated. The trigger signal is generated by a trigger signal generating portion 12 of the controller 3 (Step 106).

When a trigger signal is generated, a detected value of each sensor 4–8 is stored in memory 16 at the specified point Q as data (Step 107).

Next, in a comparison operator 17 of the controller 3, a determination is made as to whether or not the detected value of each sensor 4–8 stored in memory 16 falls within a reference value. The reference value is set by a reference value setting portion 18. The reference value is a threshold value for determining whether or not the value of an operating parameter detected by each sensor 4–8 is an abnormal value (Step 108).

As a result thereof, when it is determined that the detected value of each sensor 4–8 stored in memory 16 is larger than a reference value, a warning 20 signal is outputted from a warning outputting portion 19. In accordance therewith, a display or the like denoting a warning is made by the warning device 22 of the vehicle 50. Further, a display or the like denoting a warning is made by the warning device 32 of the monitoring station 30 (Step 109).

A determination as to whether or not the engine 2 has stopped is made 25 using the same detecting means as in Step 103 (Step 110). As long as the engine 2 has not stopped, processing returns to Step 104, and thereafter the same processing is executed once again.

As described above, every time the vehicle 50 passes a specified point Q, a detected value of each sensor 4–8, that is, an operating parameter is acquired.

Figure 7:
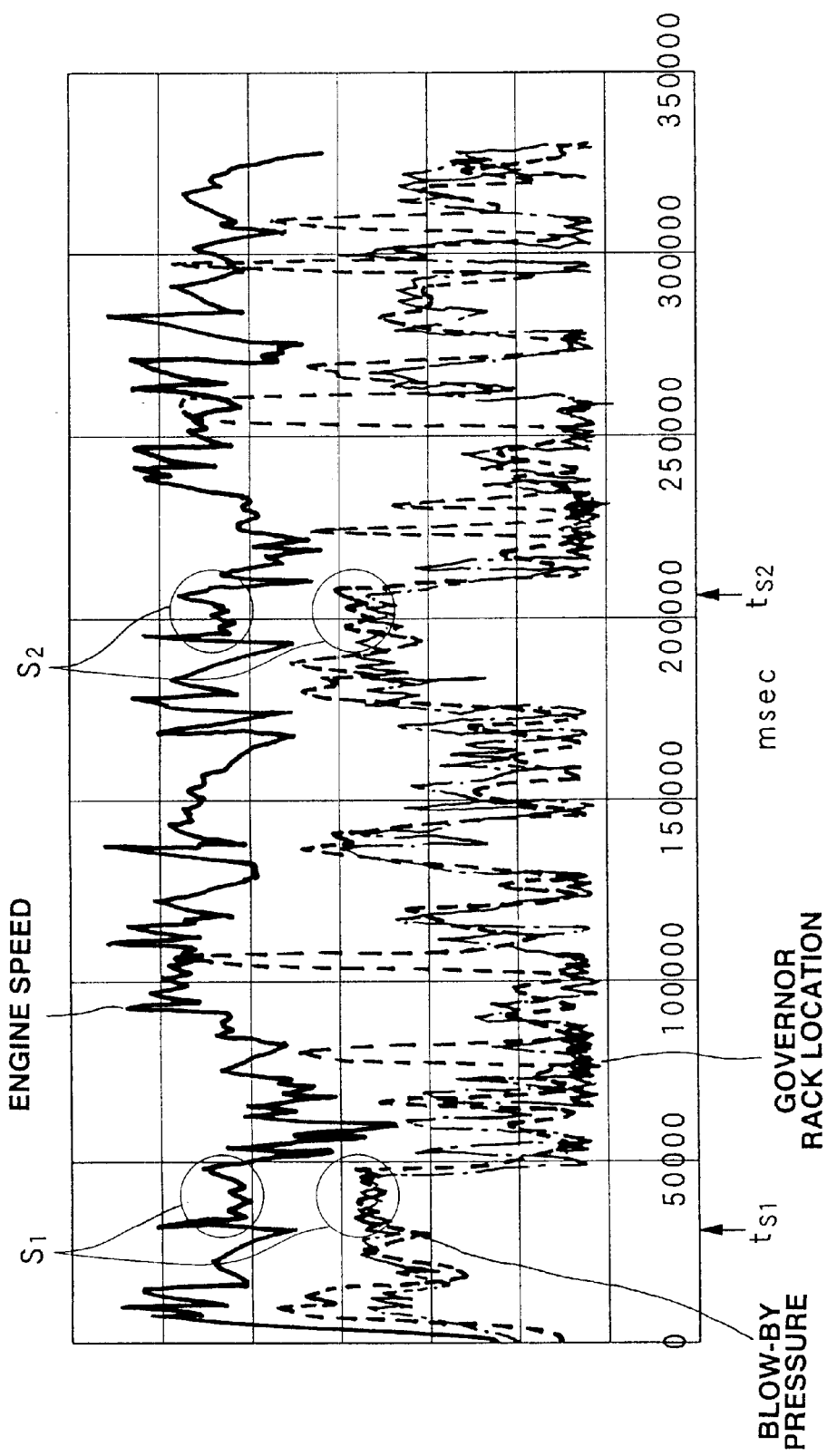
FIG. 7 is a diagram showing a waveform of each operating parameter when technology of the embodiment is used.

FIG. 7 shows a situation in which the detection signals of engine speed, blow-by pressure, and governor rack position change in accordance with the passage of time. In this FIG. 7, times ts1, ts2 denote the times at which the vehicle 50 passes through a specified point Q. At the times ts1, ts2 at which the vehicle 50 passed through the specified point Q, the same detection signal waveforms were obtained, as indicated by S1, S2. That is, it was learned that the operating condition of the vehicle 50 becomes the same operating condition every time the vehicle 50 passes through the specified point Q, and that an operating parameter is acquired under the same operating condition.

In memory 16, there is stored, under the same operating condition, an operating parameter of when the vehicle 50 passed through the specified point Q. Accordingly, from memory 16 stored data, it becomes possible to compare data under the same operating condition, making it possible to accurately diagnose an abnormality that has occurred in the vehicle 50 (the engine 2), or an abnormality that could occur in the future.

Furthermore, in this embodiment, an operating parameter is acquired every time the vehicle 50 passes the specified point Q, but an operating parameter can also be acquired each time the vehicle 50 passes a specified area Ar.

According to this embodiment, because an operating parameter is acquired under a specified operating condition while the vehicle 50 is traveling, it is not necessary to stop the vehicle 50 to take measurements. Consequently, work is not suspended, and a drop in work efficiency is not incurred. Further, since it is not necessary to perform the work of mounting measuring instruments, controlling a vehicle so that it achieves a fixed operating condition, or recording measurement data, there is no need for a person (serviceman), who is skilled in measurement work. Consequently, there is no rise in personnel costs.

Further, because an operating parameter can be acquired at a point Q, at which it becomes a specified operating condition, during the vehicle 50 travel, the operating parameter achieves saturation, and is in a stable state, enabling the collection of accurate data.

As described above, according to this embodiment, the measuring of an operating parameter under a fixed operating condition can be performed without bringing about a rise in personnel costs, and without incurring a drop in vehicle work efficiency, and accurate data can be reliably acquired.

Figure 2:
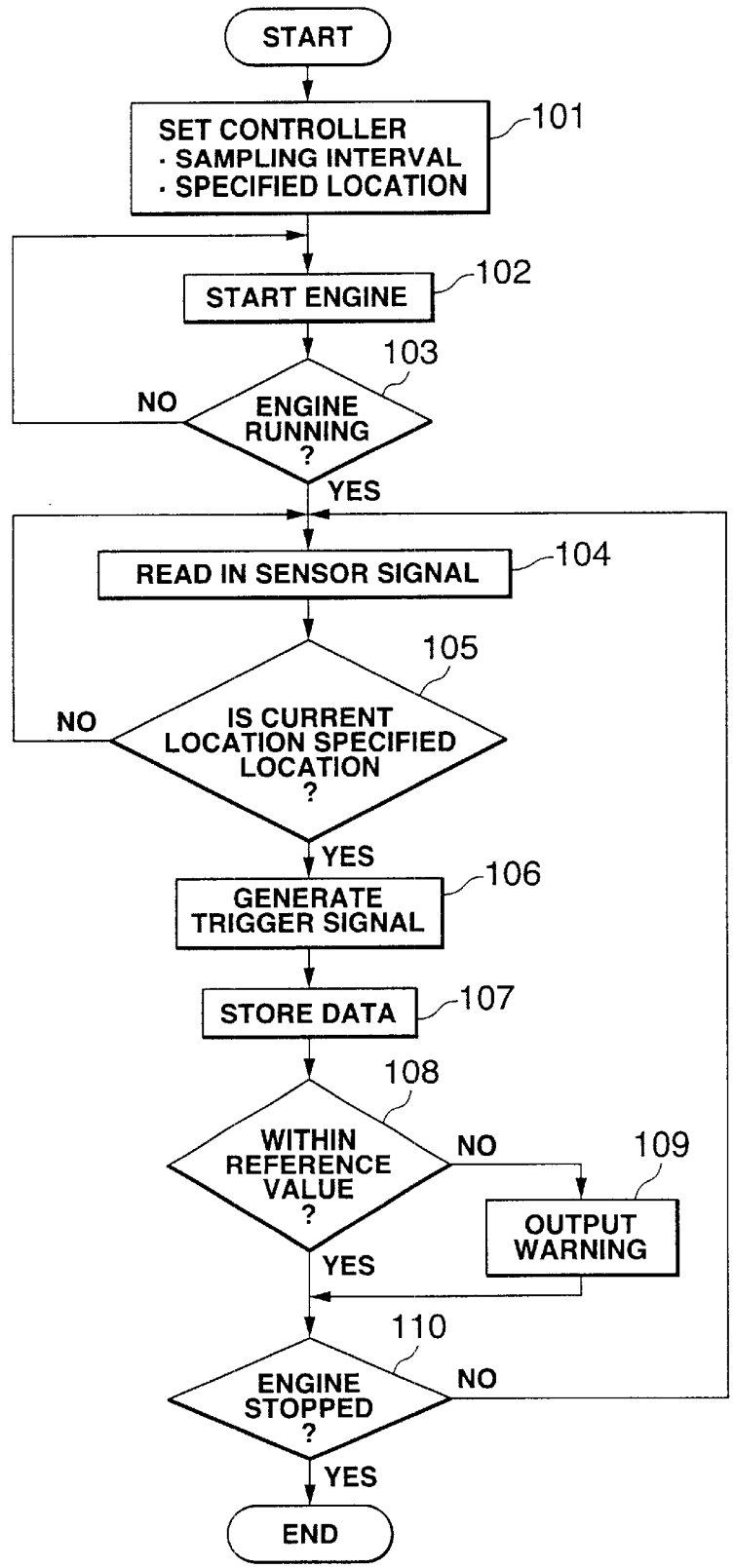
FIG. 2 is a flowchart showing an example of a processing procedure performed by a controller.

Furthermore, in the processing in FIG. 2, when a value of an operating parameter (detected value of each sensor 4–8) is larger than a reference value, a warning signal is outputted, but a warning signal can be outputted when the rate of change of the value of a previous operating parameter value and a current parameter value is larger than a reference value. In this case, the rate of change $\Delta d/\Delta ts$ from the difference $\Delta d$ between the value of an operating parameter, when the vehicle 50 passed the previous specified point Q, and the value of an operating parameter, when the vehicle 50 passed the current specified point Q, and the difference $\Delta ts$ between the time ts1, when the vehicle 50 passed the previous specified point Q, and the time ts2, when the vehicle 50 passed the current specified point Q, is computed.

Next, there will be explained an embodiment, wherein time series data is generated on the basis of an operating parameter, which is acquired every time the vehicle 50 passes through a specified point Q, and an abnormality that occurred in the vehicle 50 is diagnosed from this time series data. The processing procedures in this case are shown as the flowchart in FIG. 3.

Furthermore, this embodiment will be explained by making blow-by pressure P detected by a blow-by pressure sensor 4 representative of operating parameters.

Figure 10:
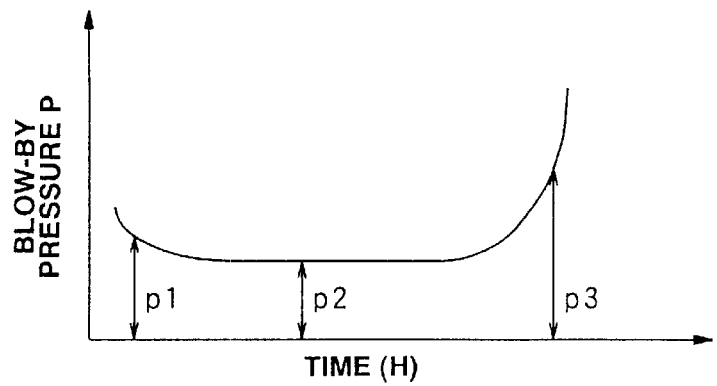
FIG. 10 is a diagram illustrating a situation in which blow-by pressure changes in accordance with an increase in an operating time integrated value.

The wear state of the engine 2 that is, the amount of damage incurred by the engine 2 can be quantitatively detected from the size of blow-by pressure, and an abnormality in the engine 2 can be diagnosed by differences in the sizes of blow-by pressures P. FIG. 10 shows a situation in which blow-by pressure P changes in accordance with the integrated value of the operating time of the engine 2 (service meter value: unit is hours H) becoming larger.

When the operating time integrated value is small shortly after the engine 2 has been shipped, the amount of wear of the engine 2 (wear of the piston rings, cylinder liners, and so forth) is small, and in accordance therewith, blow-by pressure p1 is relatively small. As the operating time integrated value becomes larger, the mechanical breaking-in state inside the engine stabilizes, and blow-by pressure p2 becomes even smaller than initial blow-by pressure p1. However, when an operating time integrated value is exceeded to a certain extent, wear rapidly progresses due to the damage incurred by the engine 2 up until that time, and in accordance therewith, blow-by pressure p3 rises. Accordingly, it is possible to determine whether or not the engine 2 has reached its use limits (overhaul time) by setting a threshold value Pc that is larger than the initial blow-by pressure P1, and determining whether or not the current blow-by pressure P is larger than the above-mentioned threshold value Pc.

Figure 3:
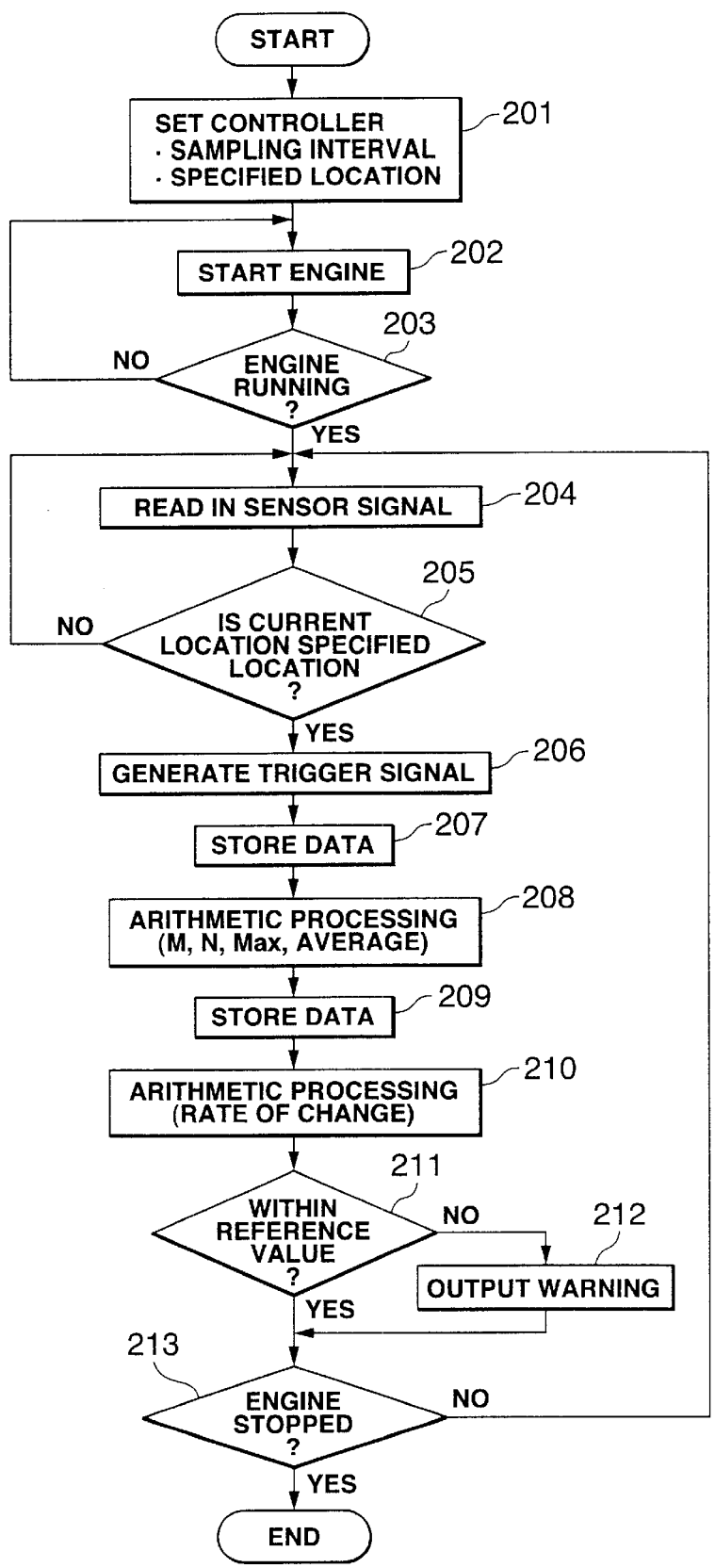
FIG. 3 is a flowchart showing another example of a processing procedure performed by the controller.

In Steps 201–207 of FIG. 3, the same processing is executed as in Steps 101–107 of FIG. 2.

The arithmetic processing of hereinbelow is executed by operator 15 of controller 3.

Figure 11:
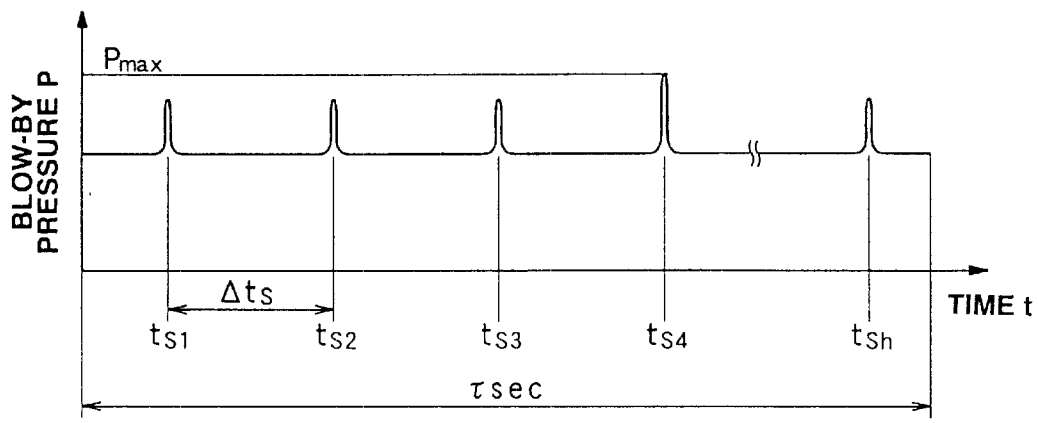
FIG. 11 is a diagram showing an operating parameter that is acquired at each specified point.

FIG. 11 shows data of blow-by pressure P, which has been sequentially acquired at times ts1, ts2, ts3, ts4, ..., tsn, at which the vehicle 50 passed a specified point Q, and sequentially stored in memory 16. The horizontal axis of FIG. 11 is time, and the vertical axis indicates the size of blow-by pressure P. When the vehicle 50 passes a specified point Q at time ts1, blow-by pressure P is acquired under a prescribed operating condition, and blow-by pressure P is acquired under the same operating condition at time ts2 after a time lapse of $\Delta ts$.

In the next Step 208, arithmetic processing, which selects a maximum value Pmax from among each blow-by pressure P stored in memory 16, is performed every time the vehicle 50 passes a specified point Q (Step 208). The same processing is carried out repeatedly as long as the engine 2 is running (Step 213). In this manner, a maximum value Pmax of when $\tau$ time has passed is stored in memory 16. The $\tau$ time, for example, is 20 hours. 20 hours is equivalent to one day of operating time of the vehicle 50. That is, the constitution is such that a maximum value Pmax from among each blow-by pressure P, which is acquired at each time ts1, ts2, ts3, ts4, ..., tsn of within the $\tau$ time, is stored in memory 16 (Step 209: refer to FIG. 11).

Figure 12:
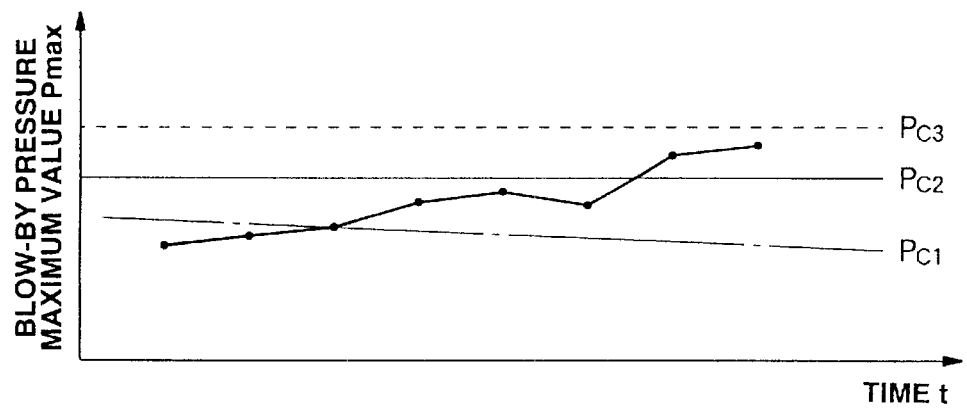
FIG. 12 is a diagram showing time series data of maximum values of an operating parameter.

The above-described processing is repeatedly executed each time T time passes. Consequently, a blow-by pressure maximum value Pmax is sequentially stored in memory 16 every $\tau$ time. FIG. 12 depicts time series data DT of a blow-by pressure maximum value Pmax acquired every $\tau$ time. The horizontal axis of FIG. 12 is time, and the vertical axis indicates the size of blow-by pressure maximum values Pmax.

In Step 210, the rate of change of blow-by pressure maximum values Pmax is computed.

Figure 13:
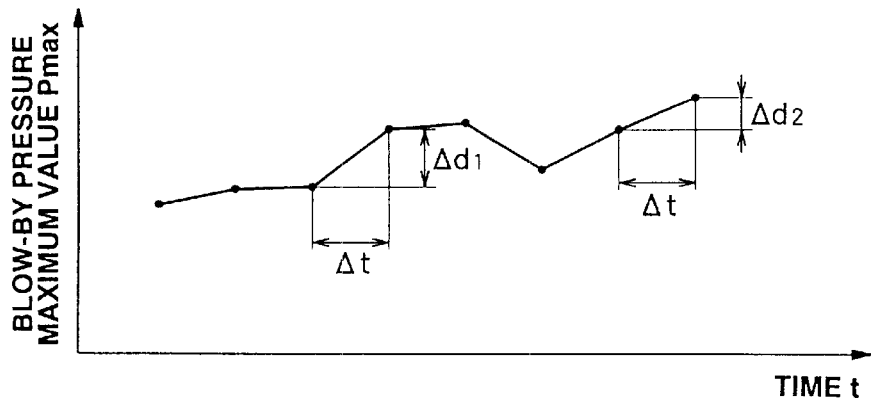
FIG. 13 is a diagram illustrating a rate of change of time series data.

FIG. 13 shows time series data DT of blow-by pressure maximum values Pmax similar to FIG. 12. As shown in this FIG. 13, rate of change of blow-by pressure maximum values Pmax $\Delta d/\Delta \tau$ is computed from the difference $\Delta d$ between a previous blow-by pressure maximum value and a present blow-by pressure maximum value, and the difference $\Delta \tau$ between a time at which a previous blow-by pressure maximum value was acquired, and a time at which a current blow-by pressure maximum value was acquired (times $\tau$ are practically identical) (Step 210).

Next, a determination is made in the comparison operator 17 of controller 3 as to whether or not the above-mentioned computed rate of change $\Delta d/\Delta \tau$ falls within a reference value. A reference value is set by a reference value setting portion 18. A reference value is a threshold value for determining whether or not a rate of change $\Delta d/\Delta \tau$ value is an abnormal value (Step 211). When this resultant rate of change $\Delta d/\Delta \tau$ is determined to be larger than a reference value, a warning signal is outputted from a warning signal outputting portion 19. In accordance therewith, a display and so forth, which is indicative of a warning, is carried out by a warning device 22 of the vehicle 50. Further, a display and so forth, which is indicative of a warning, is carried out by a warning device 32 of the monitoring station 30 (Step 212).

Furthermore, in the processing of FIG. 3, the rate of change Δd/Δτ of blow-by pressure maximum values Pmax is computed, and when this rate of change Δd/Δτ is larger than a reference value, a warning signal is outputted, but this rate of change computation can be omitted. That is, a warning signal can be outputted when a blow-by pressure maximum value Pmax is larger than, a reference value. In this case, the processing of Step 210 in FIG. 3 is omitted, and processing such as that hereinbelow is performed.

That is, in the comparison operator 17 of the controller 3, a sequential determination is made as to whether or not a blow-by pressure maximum value Pmax acquired every τ time falls within a reference value. A reference value is set by a reference value setting portion 18. A reference value is a threshold value for determining whether or not the value of a blow-by pressure maximum value Pmax is an abnormal value (Step 211). When this resultant blow-by pressure maximum value Pmax is determined to be larger than a reference value, a warning signal is outputted from a warning signal outputting portion 19. In accordance therewith, a display and so forth, which is indicative of a warning, is carried out by a warning device 22 of the vehicle 50. Further, a display and so forth, which is indicative of a warning, is carried out by a warning device 32 of the monitoring station 30 (Step 212).

Furthermore, three-tiered threshold values Pc1, Pc2, Pc3 (Pc1<Pc2<Pc3) as shown in FIG. 12 can be set as reference values. The contents of a warning signal can be made different in accordance with a case in which the value of a blow-by pressure maximum value Pmax is at a level less than threshold value Pc1, a case in which it is at a level that is larger than threshold value Pc1 but less than threshold value Pc2, a case in which it is at a level that is larger than threshold value Pc2 but less than threshold value Pc3, and a case in which it is at a level that is larger than threshold value Pc3, respectively.

Further, the degree of abnormality of the engine 2 can be made correspondent to each level. Then, the diagnosis of an abnormality that occurred in the engine 2 or an abnormality that will probably occur in the engine 2 can be carried out accurately and efficiently by comparing time series data DT and each level. That is, a diagnosis of the engine 2 malfunction, and a prediction of the engine 2 service life can be performed with accuracy.

Furthermore, in the above explanation, an abnormality diagnosis is performed by finding either time series data of blow-by pressure maximum values Pmax, or time series data of a rate of change Δd/Δτ of blow-by pressure maximum values Pmax, and a warning signal is outputted. However, depending on the type of operating parameter, either time series data of operating parameter minimum values, or time series data of the rate of change of operating parameter minimum values is determined, an abnormality diagnosis can be performed, and a warning signal can be outputted on the basis thereof. Further, either time series data of operating parameter average values, or time series data of the rate of change of operating parameter average values is determined, an abnormality diagnosis can be performed, and a warning signal can be outputted on the basis thereof.

When finding minimum value of time series data, in Steps 208, 209 of FIG. 3, a minimum value is determined from among operating parameter values of each time ts1, ts2, ts3, ts4, . . . , tsn within τ time, and stored in memory 16. This processing is repeated each τ time. As a result thereof, the same as in FIG. 12, there is acquired time series data DT, which plots operating parameter minimum values each τ time.

When finding average value time series data, in Steps 208, 209 of FIG. 3, an average value of operating parameter values of each time ts1, ts2, ts3 , ts4, . . . , tsn within τ time is determined, and stored in memory 16. This processing is repeated each τ time. As a result thereof, the same as in FIG. 12, there is acquired time series data DT, which plots operating parameter average values each τ time.

Now then, when the engine 2 achieves a rated operating condition at a specified point Q, the value detected by a blow-by pressure sensor 4 can be used as-is as data under a rated operating condition. However, when the engine 2 does not achieve a rated operating condition at a specified point Q, the sensor 4 detected blow-by pressure can be corrected to a blow-by pressure under a rated operating condition by the correction processing indicated by the following expression (1).

$$Pr=P+k1\ (Nr-N)+k2\ (Rr-R)+k3\ (Ter-Te) \qquad (1)$$

Providing that PR is a corrected blow-by pressure, P is a blow-by pressure detected by a blow-by pressure sensor 4, Nr is an already-known engine speed at a rated point, N is an engine speed detected by an engine speed sensor 5, Rr is an already-known rack voltage value at a rated point, R is a rack voltage value detected by a rack sensor 8, Ter is an already-known oil temperature at a rated point, Te is an oil temperature detected by an oil temperature sensor 7, and k1, k2, k3 are already-known constants.

This correction processing is executed by operator 15 of controller 3.

Further, in the above explanation, blow-by pressure P detected each time the vehicle 50 passes a specified point Q is uniformly stored in memory 16 as valid data. However, even if a blow-by pressure P is detected when the vehicle 50 passes a specified point Q, in a case in which the oil temperature detected by the oil temperature sensor 7 does not exceed a stipulated temperature, rather than using same as invalid data, only blow-by pressure detected when the oil temperature detected by the oil temperature sensor 7 exceeds a stipulated temperature is stored in memory 16 as valid data.

Figure 4:
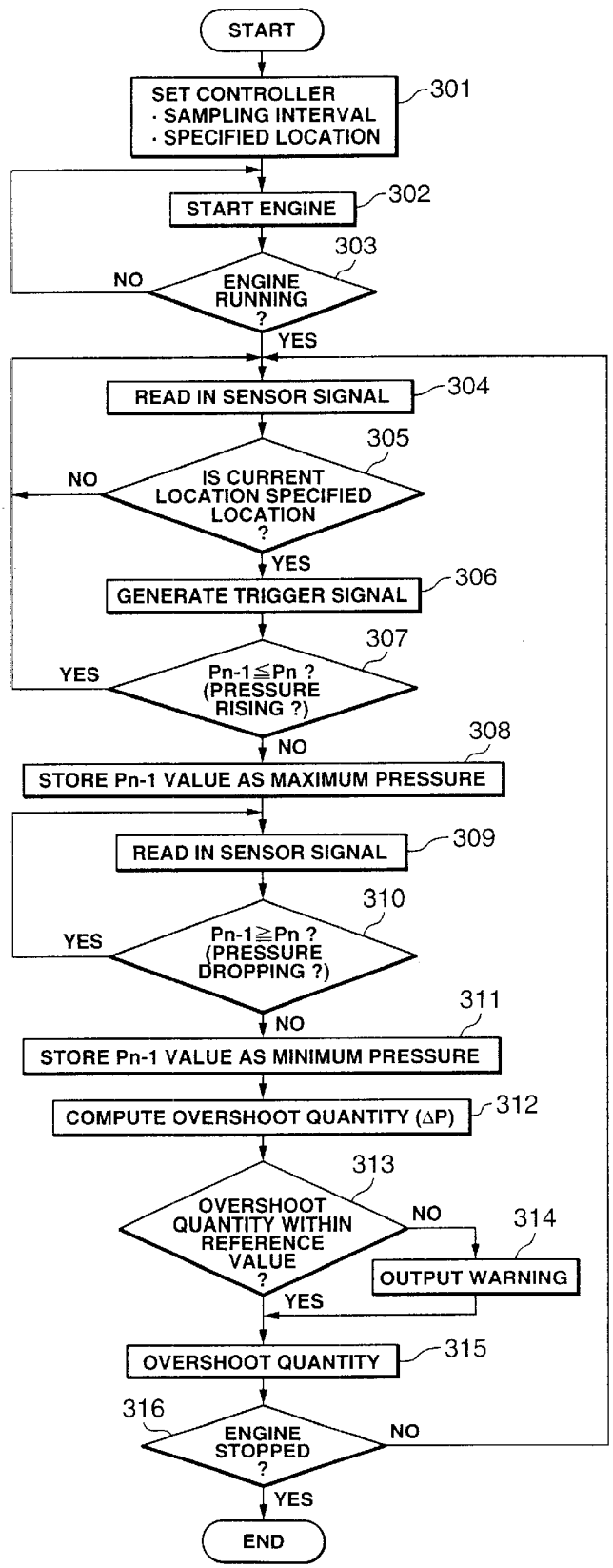
FIG. 4 is a flowchart showing a processing procedure performed by the controller.

Next, there will be explained an embodiment, which acquires a blow-by pressure P overshoot quantity ΔP, and diagnoses an abnormality of the engine 2 on the basis of the value of the acquired blow-by pressure P overshoot quantity ΔP. The processing procedure in this case is shown in FIG. 4 as a flowchart.

Figure 8:
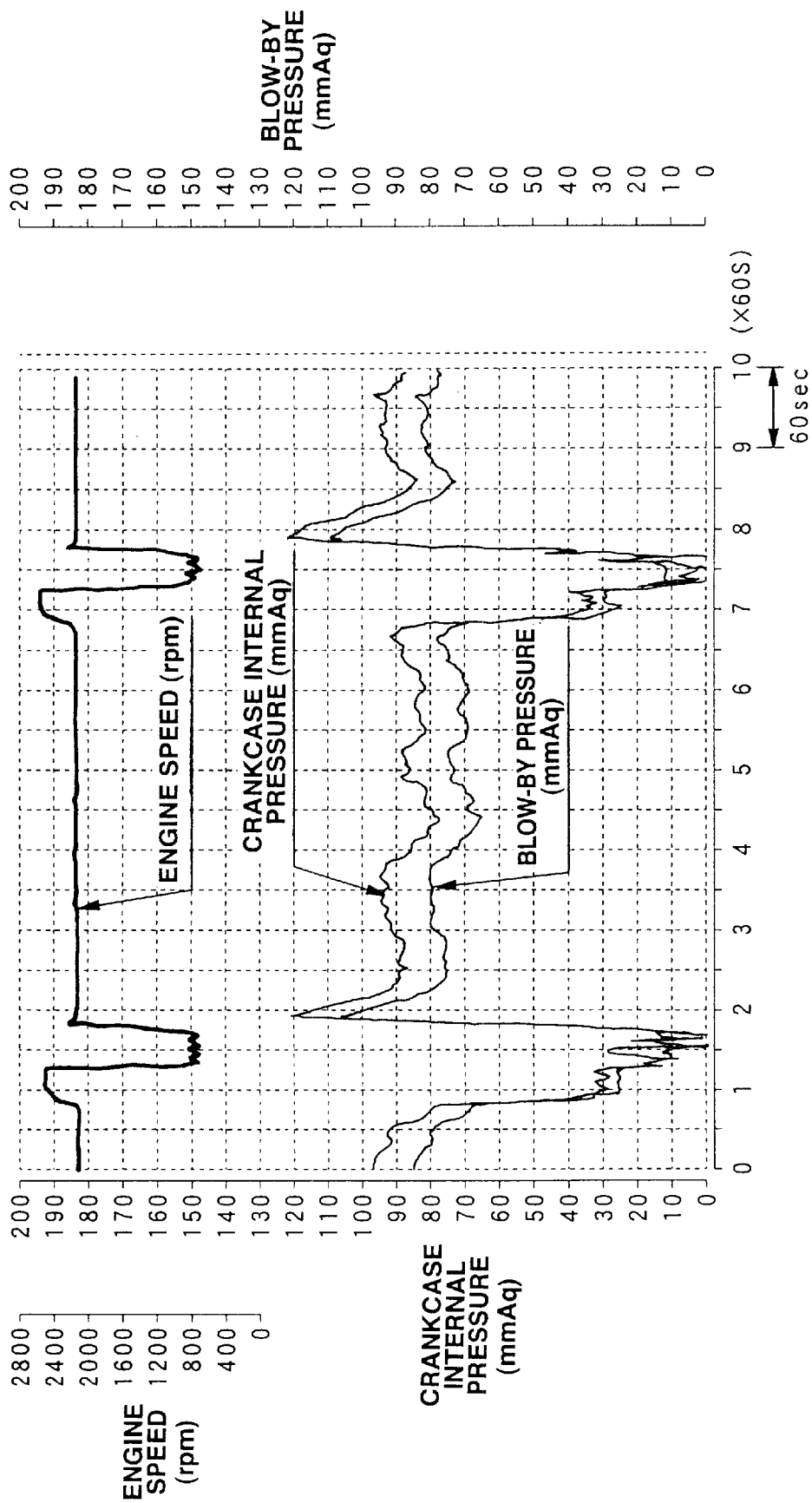
FIG. 8 is a diagram showing a situation in which blow-by pressure overshoots.

FIG. 8 is a diagram illustrating overshoot. The horizontal axis is time, and the vertical axis indicates the size of crankcase internal pressure, blow-by pressure, and engine speed of the engine 2 When the engine 2 is under a load, and achieves either a rated point, or a near rated point operating condition, blow-by pressure P rises, and blow-by pressure P overshoots as indicated by the circles.

As shown in FIG. 5, a specified point Q, at which blow-by pressure P rises, and blow-by pressure P overshoots, is set beforehand from among each point and each area of a travel route 51 which the vehicle 50 travels.

The state of wear of the engine 2 that is, the amount of damage incurred by the engine 2 can be quantitatively detected from the size of a blow-by pressure overshoot quantity ΔP, and an abnormality of the engine 2 can be diagnosed by differences in the sizes of blow-by pressure overshoot quantities ΔP1.

Figure 9A:
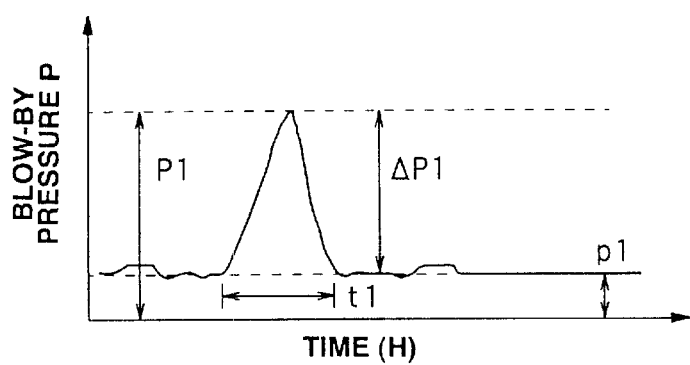
FIGS. 9(a), 9(b) and 9(c) are diagrams illustrating situations in which blow-by pressure overshoot quantities change in accordance with increases in operating time integrated values.
Figure 9B:
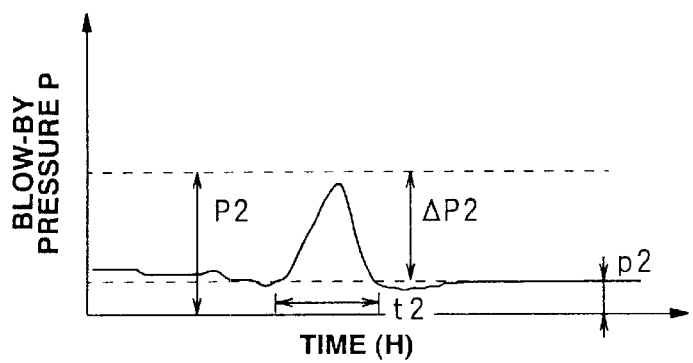
Figure 9C:
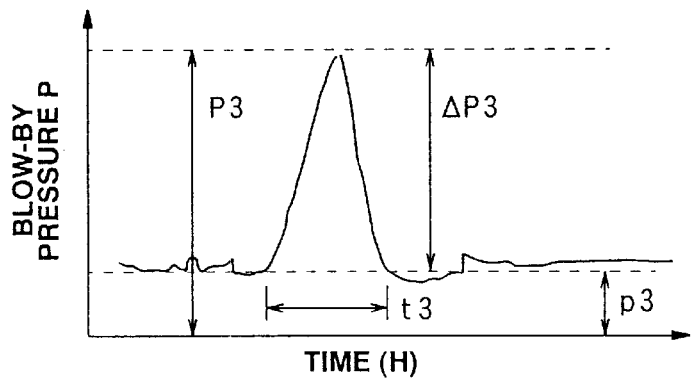

FIGS. 9(a), 9(b) and 9(c) are diagrams illustrating relationships between blow-by pressure overshoot quantity ΔP, and the engine 2 abnormality. FIGS. 9(a), 9(b) and 9(c) show the manner in which blow-by pressure P changes in accordance with an integrated value of the engine 2 operating time (service meter value: unit is hours H) becoming larger.

When the operating time integrated value is small shortly after the engine 2 has been shipped, the amount of the engine 2 wear (wear of the piston rings, cylinder liners, and so forth) is small, and in accordance therewith, as shown in FIG. 9(a), the blow-by pressure overshoot quantity ΔP1 is relatively small. As an operating time integrated value becomes larger, the mechanical breaking-in state inside the engine 2 stabilizes, and, as shown in FIG. 9(b), the blow-by pressure overshoot quantity ΔP2 becomes even smaller than the initial blow-by pressure overshoot quantity ΔP1. However, when an operating time integrated value is exceeded to a certain extent, wear rapidly progresses due to the damage incurred by the engine 2 up until that time, and in accordance therewith, as shown in FIG. 9(c), the blow-by pressure overshoot quantity ΔP3 rises. Accordingly, a determination can be made as to whether or not the engine 2 has reached its use limits (overhaul time) by setting a threshold value ΔPc that is larger than the initial blow-by pressure overshoot quantity ΔP1, and determining whether or not the current blow-by pressure overshoot quantity ΔP is larger than the above-mentioned threshold value ΔPc. Changes in blow-by pressure overshoot quantity ΔP correspond more faithfully to changes in the amount of wear of the engine 2 than changes in blow-by pressure P.

In Steps 301–303 of FIG. 4, the same processing is executed as in Steps 101–103 of FIG. 2.

In Step 305, a determination is made as to whether or not the current location of the vehicle 50 coincides with a specified point Q. As a result thereof, when the current location of the vehicle 50 coincides with a specified point Q, a trigger signal is generated (Step 306). After a trigger signal is generated, processing for reading in a prescribed time sensor signal is implemented repeatedly (Step 304, Step 309), and an overshoot quantity AP is computed (Step 312). After a trigger signal is generated, blow-by pressure P rises and overshoots during the above-mentioned prescribed time.

Further, as shown in FIG. 5, a specified area Ar can be set in place of a specified point Q.

In this case, in Step 305, a determination is made as to whether or not the current location of the vehicle 50 is between the entrance point Q1 and exit point Q2 of a specified area Ar. As a result thereof, processing for reading in a sensor signal is implemented repeatedly (Step 304, Step 309), and an overshoot quantity ΔP is computed (Step 312) only when it is determined that the current location of the vehicle 50 is between the entrance point Q1 and exit point Q2 of a specified area Ar. Blow-by pressure P rises and overshoots while the vehicle 50 passes through a specified area Ar.

The processing for computing an overshoot quantity ΔP will be explained hereinbelow. This arithmetic processing is executed by operator 15 of controller 3.

That is, a blow-by pressure Pn−1 detected at a sampling of the previous time n−1 is compared against a blow-by pressure Pn detected at a sampling of the current time n, and a determination is made as to whether or not Pn−1≦Pn. That is, a determination is made as to whether or not a blow-by pressure P is in the process of rising (Step 307). When blow-by pressure rises all the way, and reaches a maximum pressure (determination NO of Step 307), the blow-by pressure Pn−1 detected at the sampling of the previous time n−1 is stored in memory 16 as a maximum pressure (Step 308).

Next, a blow-by pressure Pn−1 detected at a sampling of the previous time n−1 is compared against a blow-by pressure Pn detected at a sampling of the current time n, and a determination is made as to whether or not Pn−1≧Pn. That is, a determination is made as to whether or not a blow-by pressure P is in the process of dropping from a maximum pressure (Step 310). When blow-by pressure drops all the way, and reaches a minimum pressure (determination NO of Step 310), the blow-by pressure Pn−1 detected at the sampling of the previous time n−1 is stored in memory 16 as a minimum pressure (Step 311).

Then, the difference between the maximum pressure obtained in Step 308, and the minimum pressure obtained in Step 311 is computed as the overshoot quantity ΔP. For example, as shown in FIG. 9(c), the difference between a maximum pressure P3 and a minimum pressure p3 is treated as the overshoot quantity ΔP3 (Step 312).

Next, in comparison operator 17 of controller 3, a determination is made as to whether or not the overshoot quantity ΔP is within a reference value ΔPc. A reference value is set by a reference value setting portion 18 (Step 313).

As a result thereof, when it is determined that the overshoot quantity ΔP is larger than a reference value ΔPc, a warning signal is outputted from a warning outputting portion 19. In accordance therewith, a display and so forth, which is indicative of a warning, is carried out by a warning device 22 of the vehicle 50. Further, a display and so forth, which is indicative of a warning, is carried out by a warning device 32 of the monitoring station 30 (Step 314).

A computed blow-by pressure overshoot quantity ΔP is stored in memory 16 every time the vehicle 50 passes either a specified point Q or a specified area Ar (Step 315). Processing moves once again to Step 304 as long as the engine 2 is still running, and the same processing is executed repeatedly thereafter.

As a result thereof, as shown in FIG. 11, sequential blow-by pressure overshoot quantities ΔP are acquired at times ts1, ts2, ts3, ts4, . . . , tsn, at which the vehicle 50 passes a specified point Q, and are sequentially stored in memory 16.

Accordingly, similar to the blow-by pressure P described above, as shown in FIG. 12, FIG. 13, there is acquired time series data DT of the maximum value, average value, and rate of change of blow-by pressure overshoot quantities ΔP.

Consequently, abnormality diagnosing can be performed on the basis of either time series data of maximum values of blow-by pressure overshoot quantities ΔPmax, or time series data of a rate of change of maximum values of blow-by pressure overshoot quantities ΔPmax.

Further, abnormality diagnosing can be performed on the basis of either time series data of average values of blow-by pressure overshoot quantities, or time series data of a rate of change of average values of blow-by pressure overshoot quantities.

Furthermore, in the embodiment explained hereinabove, an operating parameter is acquired in real-time at the point in time at which the vehicle 50 reaches either a specified point Q or a specified area Ar. However, the present invention is not limited to an implementation, which acquires an operating parameter in real-time.

There is also the possibility of an implementation, which acquires an operating parameter by collecting all operating parameters at every sampling interval while the vehicle 50 travels, and afterwards extracting from among the collected operating parameters of every sampling interval an operating parameter of a sampling time that corresponds to either a specified point Q or a specified area Ar.

Further, in the embodiment explained hereinabove, a warning signal is sent to a monitoring station 30 (or an office 30) outside the vehicle 50, but there is also the possibility of an implementation, which sends time series data to a monitoring station 30 (or an office 30).

What is claimed is:

1. A vehicle abnormality diagnosis system for acquiring an operating parameter under a specified operating condition of a vehicle, a value of the operating parameter changing during an operation of the vehicle, and for diagnosing a vehicle abnormality on the basis of the value of the acquired operating parameter, wherein either a specified point or a specified area, at which the vehicle operating condition becomes the specified operating condition, is set beforehand from among points or areas on a travel route along which the vehicle travels, and an operating parameter of a point in time, at which the vehicle passed either the specified point or the specified area, is acquired, and an abnormality of a vehicle is diagnosed on the basis of a value of the acquired operating parameter.

2. The vehicle abnormality diagnosis system according to either claim 1, wherein the operating parameter is sequentially stored by corresponding the operating parameter to a time at which the operating parameter was acquired, and diagnosis of a vehicle abnormality is performed on the basis of time series data of the stored sequential operating parameters.

3. A vehicle abnormality diagnosis system for acquiring an operating parameter under a specified operating condition of a vehicle, a value of the operating parameter changing during an operation of the vehicle, and for diagnosing a vehicle abnormality on the basis of the value of the acquired operating parameter, comprising:

setting means for setting beforehand from among points or areas on a travel route along which the vehicle travels, either a specified point or a specified area at which an operating condition of the vehicle becomes the specified operating condition;

position detecting means for detecting a location of the vehicle when the vehicle is travelling on the travel route;

trigger signal generating means for generating a trigger signal when the location detected by the position detecting means becomes a location corresponding to either the specified point or specified area;

operating parameter acquiring means for acquiring an operating parameter in accordance with the trigger signal being generated; and abnormality diagnosing means for diagnosing a vehicle abnormality on the basis of a value of the acquired operating parameter.

4. The vehicle abnormality diagnosis system according to claim 3, wherein the operating parameter is sequentially stored by corresponding the operating parameter to a time at which the operating parameter was acquired, and diagnosis of a vehicle abnormality is performed on the basis of time series date of the stored sequential operating parameters.

5. A vehicle abnormality diagnosis system for acquiring data related to blow-by pressure under a specified operating condition of a vehicle, a value of the data changing during an operation of an engine of the vehicle, and for diagnosing a vehicle abnormality on the basis of the value of the acquired blow-by pressure-related data, wherein either a specified point or a specified area, at which blow-by pressure rises and the blow-by pressure overshoots, is set beforehand from among points or areas on a travel route along which the vehicle travels, and a blow-by pressure overshoot quantity of a point in time, at which the vehicle passes either the specified point or the specified area, is acquired, and a vehicle abnormality is diagnosed on the basis of a value of the acquired blow-by pressure overshoot quantity.

6. A vehicle abnormality diagnosis system for acquiring data related to blow-by pressure, a value of the data changing during an operation of an engine of a vehicle, and for diagnosing a vehicle abnormality on the basis of the value of the acquired blow-by pressure-related data, comprising:

blow-by pressure overshoot quantity measuring means for measuring an overshoot quantity when blow-by pressure rises and the blow-by pressure overshoots; and abnormality diagnosing means for diagnosing a vehicle abnormality on the basis of a value of the measured blow-by pressure overshoot quantity.

* * * * *